S. BROADMEADOW.

Refining Iron and Steel.

No. 174.

Patented Apr. 5, 1837.

AM. PHOTO-LITHO. CO. N.Y. (OSBORNE'S PROCESS.)

UNITED STATES PATENT OFFICE.

SIMEON BROADMEADOW, OF NEW YORK, N. Y.

IMPROVEMENT IN THE CONSTRUCTION OF FURNACES FOR THE MANUFACTURE OF SHEAR-STEEL AND OF CAST-STEEL BY THE AID OF ANTHRACITE COAL.

Specification forming part of Letters Patent No. 174, dated April 5, 1837.

*To all whom it may concern:*

Be it known that I, SIMEON BROADMEADOW, of the city of New York, in the State of New York, have invented an Improvement in the Mode of Constructing Furnaces for the Manufacture of Shear-Steel and of Cast-Steel by the Aid of Anthracite Coal as a Fuel; and I do hereby declare that the following is a full and exact description thereof.

My furnace may be varied in size without altering the principle upon which it is constructed. I do not, therefore, intend to limit myself in this particular by the definite size and proportions which I am about to indicate, but for the purpose of exemplification only refer to one which I have found to answer well in practice.

Figure 1:
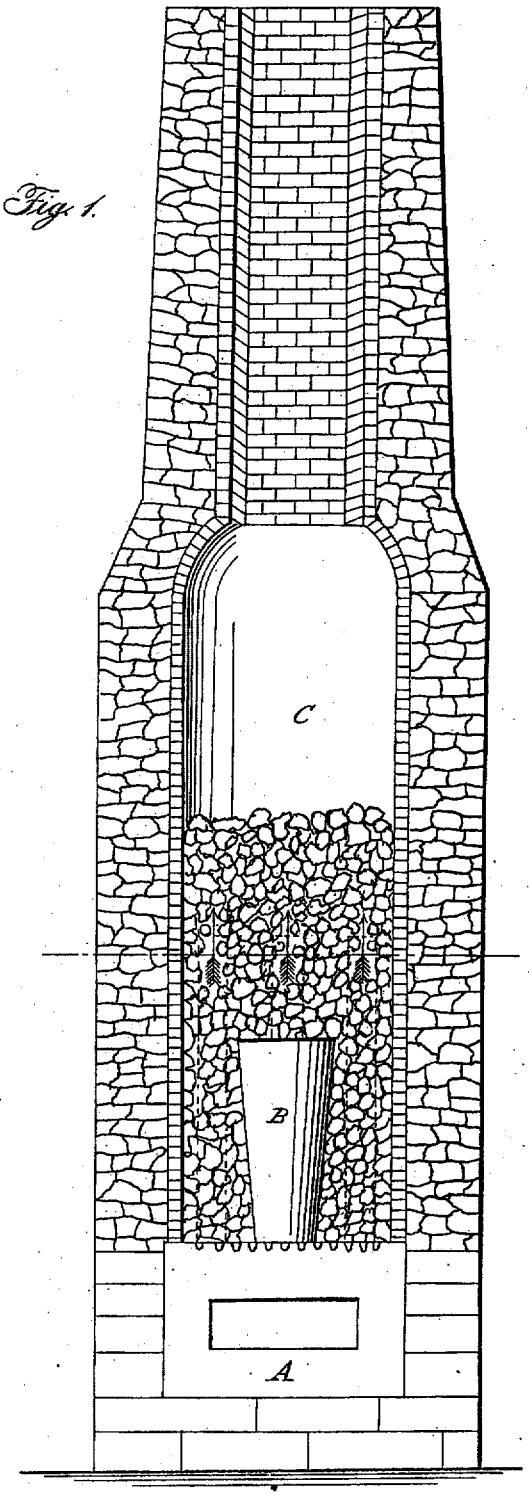
Figure 2:
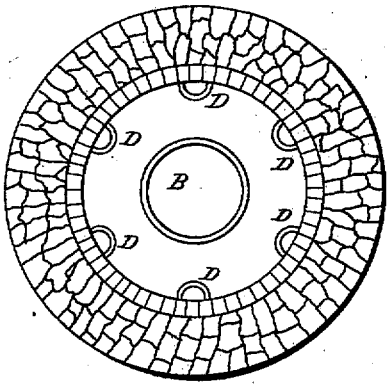

Figure 1 in the accompanying drawings represents a longitudinal section of the lower part of the furnace and the main flue, and Fig. 2 a horizontal section through the internal flues which surround the fuel and the crucible. In each of these figures those parts which are identical are designated by the same letters of reference.

The dimensions which I am about to give are such as answer for a furnace which is to make about one hundred and sixty pounds per day.

A is the ash-pit, formed as usual. B is the crucible to contain the metal, which may measure five inches at the bottom, seven inches at the top, and eighteen inches in height. The furnace C is eighteen inches in diameter and four feet six inches high, measuring from the grate-bars. Above this the flue is forty feet in height and nine inches square. It is, of course, to be lined with fire-brick. Within the furnace there are six interior flues, which extend up from the grate-bars to a point above the top of the crucible, but terminating four or five inches below the top of the fire. These flues are shown at D D in both figures, their situation being represented by red lines in Fig. 1. The openings through them should be about an inch square, and it will be seen that they give to the horizontal section of the furnace a hexagonal form. The effect of these flues is to carry up a sufficient quantity of air to produce perfect combustion and intense heat at the upper as well as the lower part of the furnace. It will be manifest that the number of these interior flues may be varied, as may also the height to which they extend, while the object in view—the supplying air to the upper portion of the fuel—will still be attained. With a furnace of this description, in which anthracite is used as a fuel, the melting is rapidly effected, and steel of a perfectly good quality is produced. It is well understood by those conversant in the art that if the melting be slow the steel is deteriorated, what is technically called a "dead melting" being produced, in which case it will crack when wrought under the tilt-hammer or by means of rolls. I have essayed the making of steel by coke from the various kinds of bituminous coal in the United States, but have been unable to command a degree of heat by which that of good quality could be produced, while by means of anthracite in my furnace I have been perfectly successful. The coal must be broken to nut size preparatory to surrounding the melting-pots in the furnace therewith. The height of chimney which I have prescribed I have found requisite in consequence of the anthracite being much heavier than coke, and not operating well without a stack thus elevated. In using this kind of fuel, the interior flues or some analogous contrivance for feeding air to the upper part of the furnace I have also found absolutely necessary.

Although I do not intend to make any claim to the composition of the melting-pots which I employ, I have found those made as follows to stand well, and therefore insert it as a safe guide to the workman: I take fifteen pounds of the best fire-clay or alumine, one pound of well-pulverized coke, four pounds of fire-brick in fine powder, and mix these ingredients thoroughly in a dry state. To this mixture I add water enough to give it the proper consistence for molding into pots and lids. The form and size of my crucibles are the same as those ordinarily used—say about five inches at the bottom, seven at the top, and eighteen deep.

What I claim as my invention, and wish to secure by Letters Patent, is—

The constructing of a furnace possessing the general characteristics of that herein described—that is to say, with a chimney of extraordinary height for the size of the furnace, and furnished with interior flues, operating in the manner and for the purpose set forth, for the manufacture of shear-steel and cast-steel by means of anthracite.

SIMEON BROADMEADOW.

Witnesses:
S. LABAGH, Jr.,
G. WOMIDOR.